United States Patent
Chang (10) Patent No.: US 11,548,109 B1
(45) Date of Patent: Jan. 10, 2023

(54) CHAIN-TYPE TOOL MAGAZINE

(71) Applicant: SANJET INTERNATIONAL CO., LTD., Taichung (TW)

(72) Inventor: Ching-San Chang, Taichung (TW)

(73) Assignee: SANJET INTERNATIONAL CO., LTD., Taichung (TW)

( * ) Notice: Subject to any disclaimer, the term of this patent is extended or adjusted under 35 U.S.C. 154(b) by 0 days.

(21) Appl. No.: 17/585,980

(22) Filed: Jan. 27, 2022

(51) Int. Cl.
*B23Q 3/157* (2006.01)
*B23Q 3/155* (2006.01)

(52) U.S. Cl.
CPC ..... *B23Q 3/15526* (2013.01); *B23Q 3/15724* (2016.11); *Y10T 483/1891* (2015.01)

(58) Field of Classification Search
CPC .......... Y10T 483/1891; B23Q 3/15724; B23Q 3/15526
USPC .......................................................... 483/68
See application file for complete search history.

(56) References Cited

U.S. PATENT DOCUMENTS

| | | | | | |
|---|---|---|---|---|---|
| 4,699,276 | A | * | 10/1987 | Kis | B23Q 3/15724 483/68 |
| 8,740,761 | B2 | * | 6/2014 | Tullmann | B23Q 3/15724 483/68 |
| 2016/0271746 | A1 | * | 9/2016 | Nakashima | B23Q 3/15724 |

FOREIGN PATENT DOCUMENTS

| | | | |
|---|---|---|---|
| DE | 9414140 U1 | * | 10/1994 |
| DE | 102010047557 A1 | * | 3/2012 |
| EP | 3599048 A1 | * | 1/2020 |
| TW | M624918 U | * | 3/2022 |

OTHER PUBLICATIONS

Machine Translation of EP 3599048 A1, which EP '048 was published Jan. 2020.*
Machine Translation of DE 9414140, which DE '140 was published Oct. 1994.*
Machine Translation of DE 102010047557 A1, which DE '557 was published Mar. 2012.*

* cited by examiner

*Primary Examiner* — Erica E Cadugan
(74) *Attorney, Agent, or Firm* — Birch, Stewart, Kolasch & Birch, LLP (57) ABSTRACT

A chain-type tool magazine includes a main body, a track, a chain, and a driving mechanism. The track is coupled to the mounting surface of the main body and provides a running route which includes a physical support segment and at least one vacant running segment. The chain is formed by a plurality of tool chains connected in series and is driven by the driving mechanism to run around the running route. When each of the tool chains of the chain passes through the physical support segment, each of the tool chains is in contact with the physical support segment. When each of the tool chains of the chain passes through the vacant running segment, each of the tool chains is not in contact with the track. With a discontinuous broken-track type design of the track, the cost can be reduced.

16 Claims, 11 Drawing Sheets

CHAIN-TYPE TOOL MAGAZINE

BACKGROUND OF THE INVENTION

Technical Field

The present invention is related generally to a chain-type tool magazine, and more particularly relates to a chain-type tool magazine with broken tracks.

Description of Related Art

It is known that a chain-type tool magazine is a large-scale machine which is able to store more than dozens of tools. By driving a chain with tools to run around a predetermined track, the tool is carried to a predetermined position, so that an operation procedure of tool changing continues to perform.

Take a chain-type tool magazine whose main body is mounted vertically upright as an example, a guide rail is mounted on the main body to provide a running route for a chain. The guide rail provides a contact support for the chain as the chain runs around so that the chain is able to move stably. To avoid improper deflection of the moving chain, the guide rail of the known chain-type tool magazine is formed by an outer guide rail and an inner guide rail which extend in parallel and are spaced apart. The chain is confined between the outer peripheral guide rail and the inner peripheral guide rail and is controlled to run around the route provided by the guide rail. However, the guide rail is a fully enclosed track, that is, the outer peripheral guide rail and the inner peripheral guide rail are continuous structures. Meanwhile, a total length of the outer peripheral guide rail and the inner peripheral guide rail affect construction cost and a total weight of the tool magazine. The cost and the weight must be considered by a tool magazine manufacturer in the development. Secondly, most of the existing chain-type tool magazines are special-purpose machines. The tool pots on the chain are only suitable for inserting one specific size of tool holders, not for other sizes of tool holders, which means that the chain of the existing chain-type tool magazine is not general, reducing its practicality.

BRIEF SUMMARY OF THE INVENTION

In view of the above, the primary objective of the present invention is to provide a chain-type tool magazine which reduces construction cost and the weight of the tool magazine based on not affecting the existing functions of the tool magazine.

The present invention provides a chain-type tool magazine including a main body, a track, a chain, and a driving mechanism. The main body includes a mounting surface which is coupled to the track providing a running route. The running route includes a physical support segment and at least one vacant running segment. The chain is formed by a plurality of tool chains connected in series. The driving mechanism is for driving the chain to run around the running route provided by the track. When each of the tool chains of the chain passes through the physical support segment, each of the tool chains is in contact with the physical support segment. When each of the tool chains of the chain passes through the vacant running segment, each of the tool chains is not in contact with the track.

The advantage of the present invention is that the track takes a discontinuous broken-track type design, reducing the construction cost of the track.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

The following illustrative embodiments and drawings are provided to illustrate the disclosure of the present invention, these and other advantages and effects can be clearly understood by persons skilled in the art after reading the disclosure of this specification.

Figure 1:
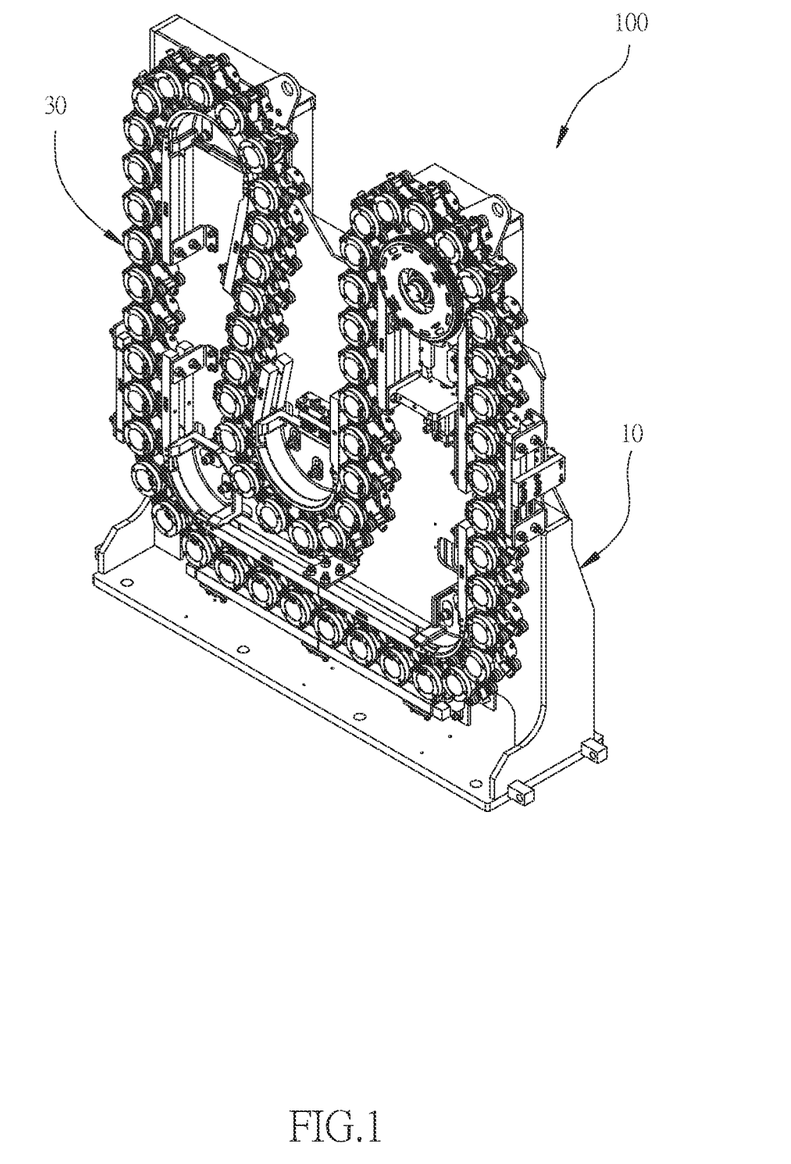
FIG. 1 is a perspective view of a chain-type tool magazine of a preferred embodiment according to the present invention.
Figure 2:
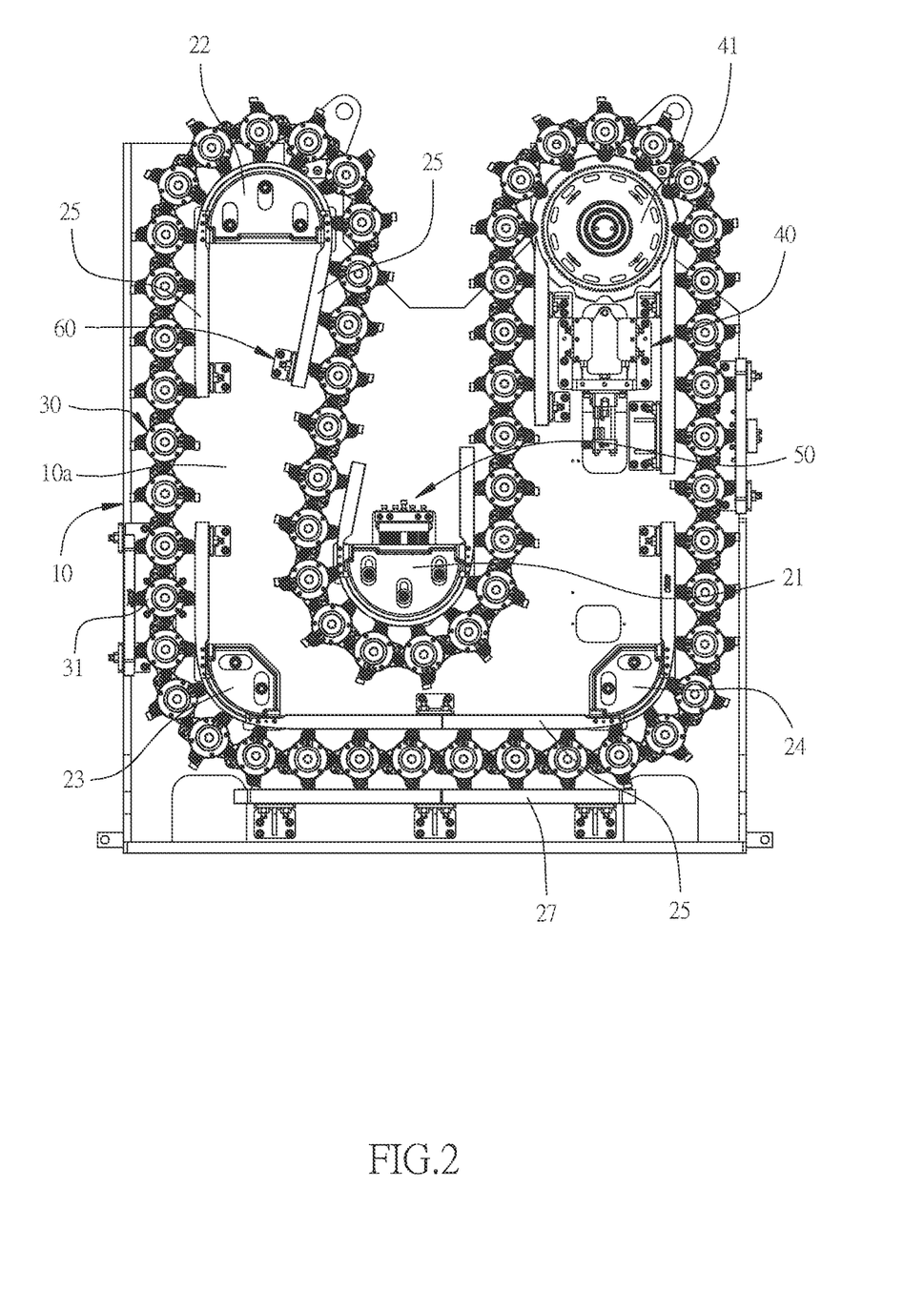
FIG. 2 is a front view of the chain-type tool magazine of the preferred embodiment.
Figure 3:
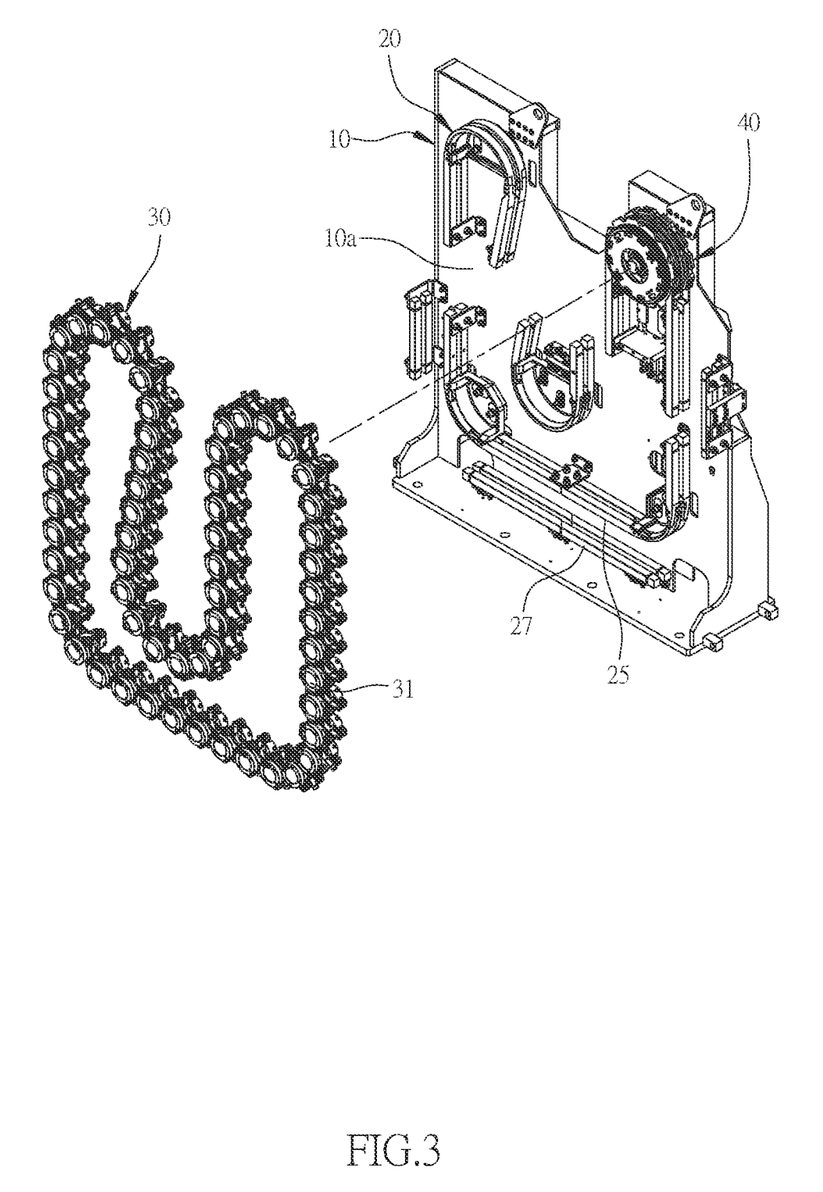
FIG. 3 is an exploded view of the chain-type tool magazine of the preferred embodiment.

As shown in FIG. 1 to FIG. 3, a chain-type tool magazine 100 of a preferred embodiment according to the present invention includes a main body 10, a track 20, a chain 30, and a driving mechanism 40. The main body 10 is an upright solid structure with a vertically arranged mounting surface 10a. The track 20 is coupled to the mounting surface 10a and provides a running route. The chain 30 is formed by a plurality of tool chains (tool chain links) 31 connected in series. The driving mechanism 40 is for driving the chain 30 to run around the running route provided by the track 20.

The running route of the track 20 includes a physical support segment and at least one vacant running segment. When each of the tool chains 31 of the chain 30 passes through the physical support segment, each of the tool chains 31 is in contact with the physical support segment. When each of the tool chains 31 of the chain 30 passes through the vacant running segment, each of the tool chains 31 passes in a suspended manner and is not in contact with the track. The physical support segment includes a lateral surface and a guide groove which provide the chain to abut against and confine the chain to a specific area. Specifically, the physical support segment is formed by at least one steering base and at least one linear guide rail, and the lateral surface and the guide groove are formed on the steering base and the linear guide rail. A number of the steering bases and the linear guide rail are related to a length of the running route and affect volumetric efficiency of the tool magazine.

Figure 4:
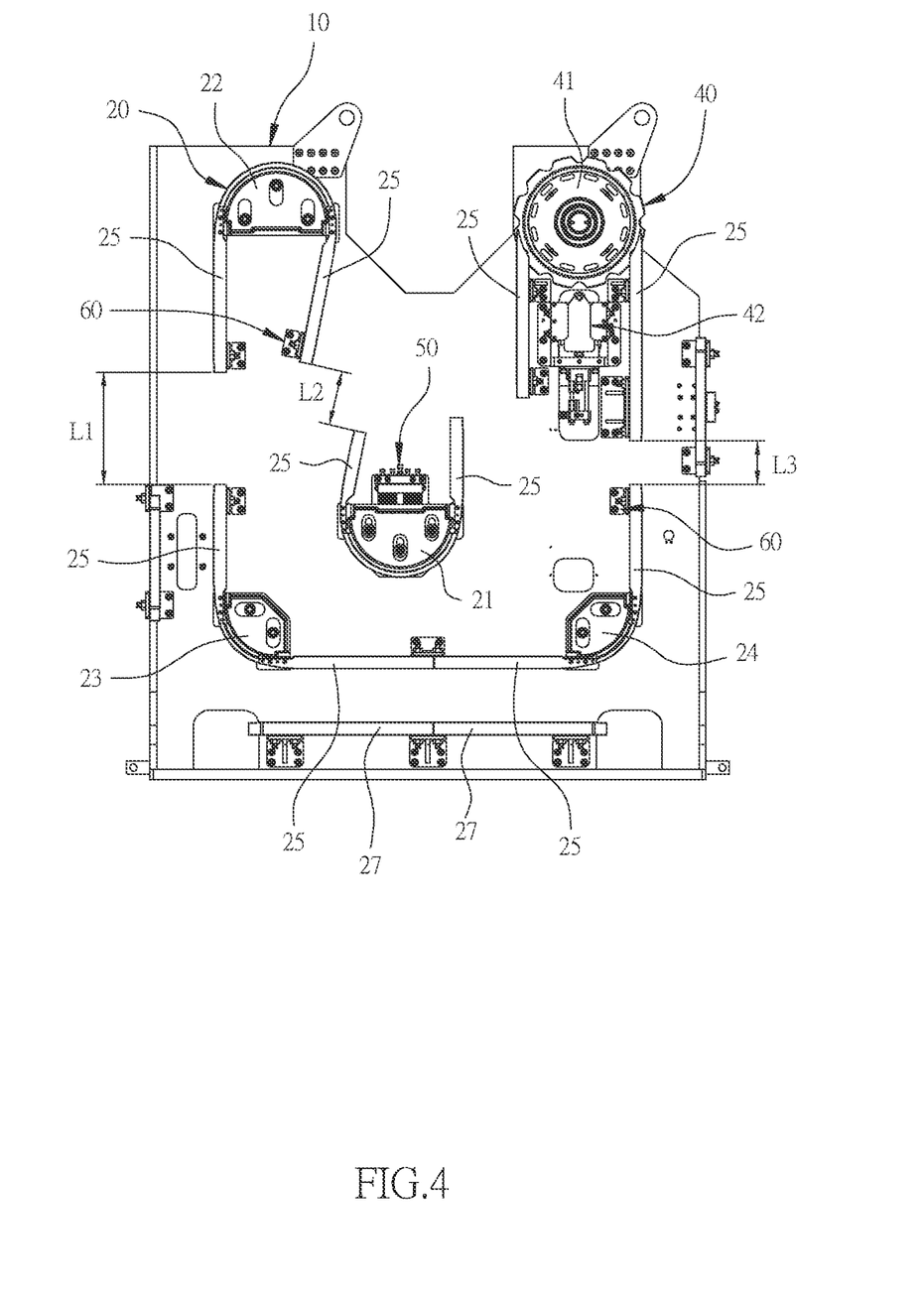
FIG. 4 is a front view of a main body and a track of the chain-type tool magazine of FIG. 3 of the preferred embodiment.

As shown in FIG. 4, there are a plurality of the steering bases and the guide rails forming the physical support segment of the current preferred embodiment. The steering bases include a first steering base 21, a second steering base 22, a third steering base 23, and a fourth steering base 24. A set of two linear guide rails are assembled with one steering base. The first steering base 21 and the second steering base 22 respectively have semicircle bodies while the third steering base 23 and the fourth base 24 respectively have sector bodies. Each of the steering bases respectively has an arc surface, two ends of the arc surface connecting to an end of one linear guide rail 25. The vacant running segment defined in the present invention is formed by a discontinuous part between two adjacent linear guide rails on the running route. As shown in FIG. 4, the vacant running segment of the current embodiment includes a first vacant running segment L1, a second vacant running segment L2, and a third vacant running segment L3. Preferably, the vacant running segment is located vertically upward on the running route. And, a number of the vacant running segments is related to a length of the running route, that is, the longer the running route, the more the predetermined vacant running segment.

Figure 5:
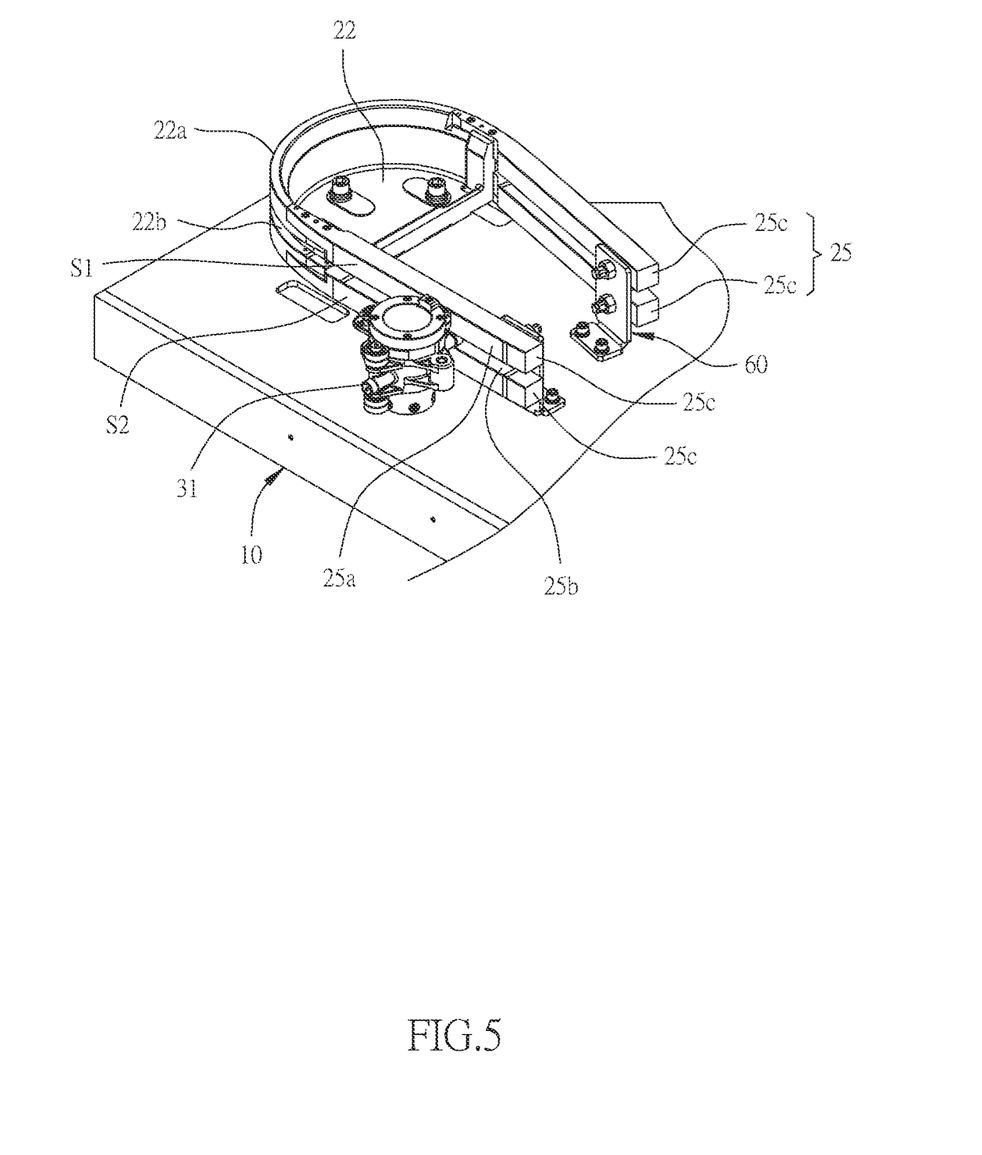
FIG. 5 is a partial perspective view of the chain-type tool magazine of the preferred embodiment.
Figure 6:
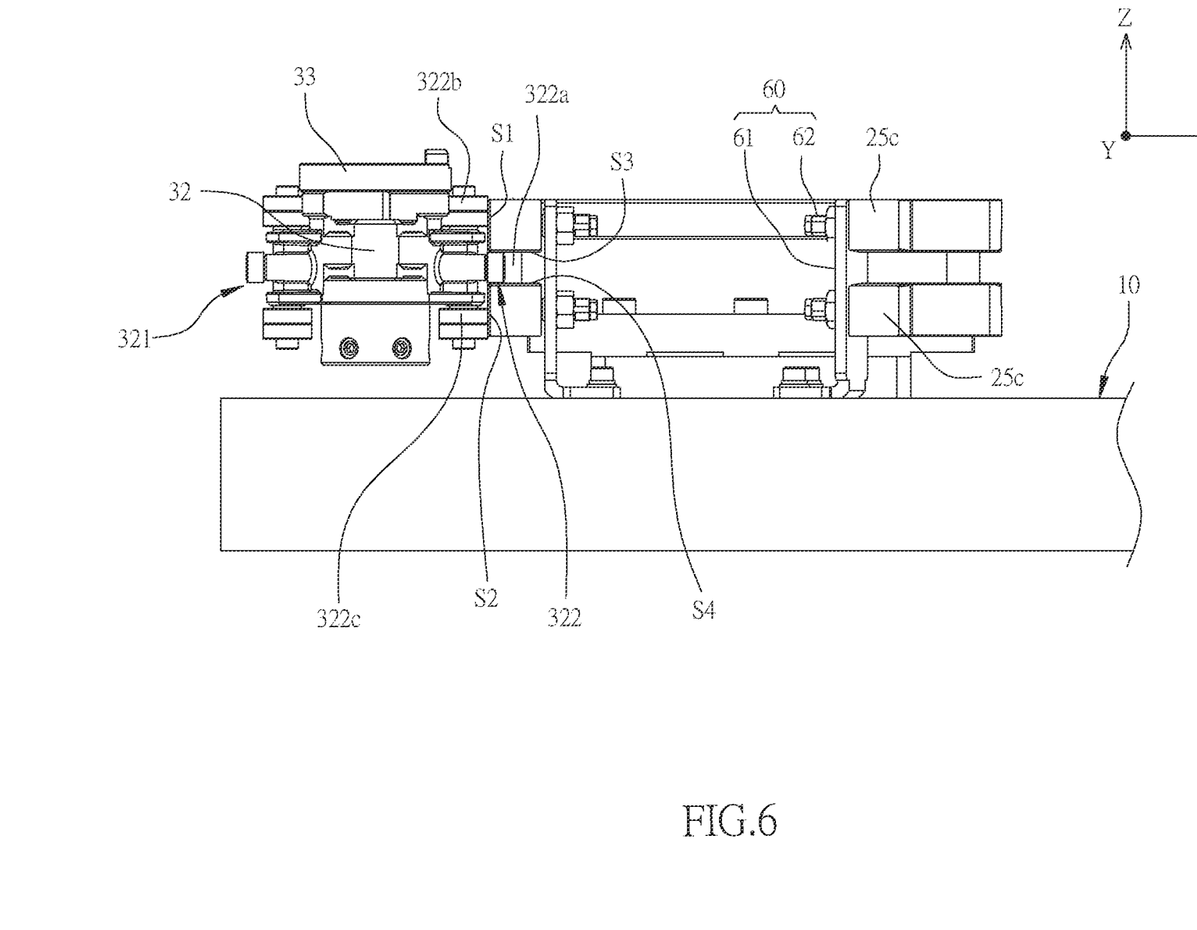
FIG. 6 is a side view of the chain-type tool magazine of the preferred embodiment.

As shown in FIG. 5 and FIG. 6, take the second steering base 22 and the two corresponding linear guide rails 25 as an example to further illustrate the lateral surface and the guide groove on the physical support segment of the current embodiment. The arc surface 22a of the second steering base 22 and a side surface 25a of the linear guide rail 25 together form a part of the lateral surface of the physical support segment. The second steering base 22 has a curved groove 22b arranged along the arc surface 22a and the linear guide rail 25 has a strip groove 25b. The curved groove 22b and the strip groove 25b together form a part of the guide groove of the physical support segment. The guide groove has a lateral opening to divide the lateral surface into an upper abutting surface S1 and a lower abutting surface S2. And, the guide groove has an upper confining surface S3 and a lower confining surface S4 facing each other. It should be noted that the linear guide rail 25 can be a single rail structure with a strip groove formed by a recessed side surface of the rail. The linear guide rail 25 can also be formed by two rails 25c spaced up and down as disclosed in the current embodiment, in which the strip groove 25b is formed between the two rails 25c.

The first steering base 21 of the current embodiment is coupled to the main body 10 in a manner that the first steering base 21 can be pushed to move on the mounting surface 10a. The second steering base 22, the third steering base 23, and the fourth steering base 24 are coupled to the main body 10 fixedly. The first steering base 21 is movable and provided with a chain tension regulator 50 so that the tension of the chain 30 can be maintained in a stable and balanced state. The specific structure which can achieve the purpose is demonstrated below.

Figure 7:
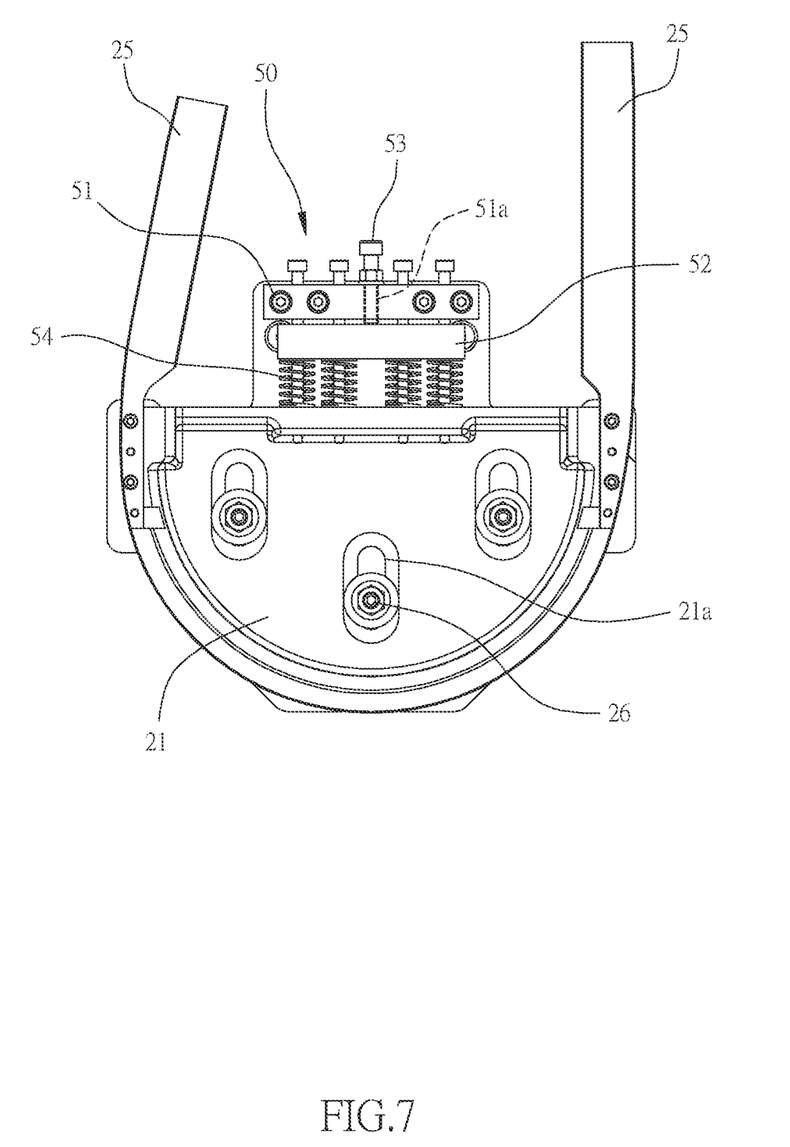
FIG. 7 is a partial schematic view of the chain-type tool magazine of the preferred embodiment.

As shown in FIG. 7, the method that the first steering base 21 can be pushed to move is illustrated as follows. The first steering base 21 is provided with a plurality of long grooves 21a extending in the same direction. The long groove 21a is passed through by a plurality of dowel pins 26 fixed to the main body 10 so that the first steering base 21 can only move horizontally but not deflect, that is, the long groove 21a restricts a moving range of the first steering base 21. Besides, the chain tension regulator 50 includes a fastening block 51, a moving block 52, an adjusting member 53, and a plurality of elastic members 54. The fastening block 51 is fixed on the main body 10 and has a screw hole 51a. The moving block 52 is movably disposed between the fastening block 51 and the first steering base 21. The adjusting member 53 is a screw and a part of the screw body is screwed into the screw hole 51a. An end of the screw passes out of the fastening block 51 and abuts against the moving block 52. An end of each of the elastic members 54 applies to the first steering base 21, and the other end thereof abuts against the moving block 52 so that elasticity applies to the adjusting member 53. The elastic potential energy of the elastic members 54 can be changed by adjusting whether the adjusting member 53 is screwed in or out relative to the fastening block 51. The elastic members 54 can absorb the vibration generated by the chain 30 when running around by means of deformation so as to effectively keep the tension balance of the chain 30 and make the chain 30 run smoothly.

It is noted that a number of the adjusting members 53 and the elastic member 54 may be increased or decreased depending on the actual demand, such as one or more than one. Although the movable steering base takes the first steering base 21 as an example, in practice, it can be the second steering base 22, or both the first steering base 21 and the second steering base 22 are movable. Through the structure of the movable steering bases together with the chain tension regulators 50, the purpose of maintaining the stable and balanced tension of the chain 30 is achieved. The current embodiment further includes at least one rail regulation unit 60 which is for fine-tuning a position of at least one of the linear guide rails 25 and improves the tension stability of the chain 30. As shown in FIG. 4 and FIG. 5, each of the linear guide rails 25 is provided with one rail regulation unit 60 which includes a fastening plate 61 and two adjusting bolts 62. The fastening plate 61 is fixed to the main body 10. The two adjusting bolts 62 respectively pass through the fastening plate 61 and are screwed into the screw holes (not shown) of the two corresponding rails 25c. Each of the rails 25c can be slightly pushed or pulled by turning the corresponding one adjusting bolt 62c in a forward or reverse direction, which improves the tension stability of the chain 30.

Figure 8:
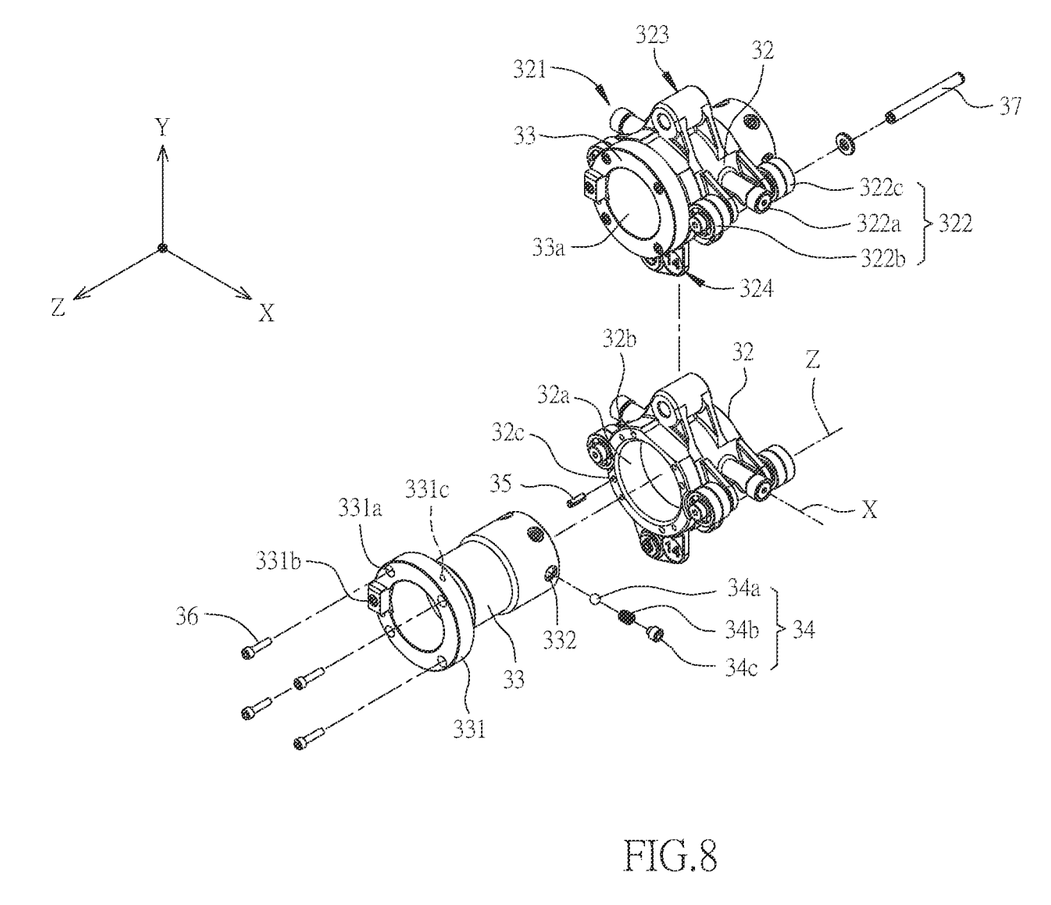
FIG. 8 is a partial exploded view of a chain of the chain-type tool magazine of the preferred embodiment.
Figure 9:
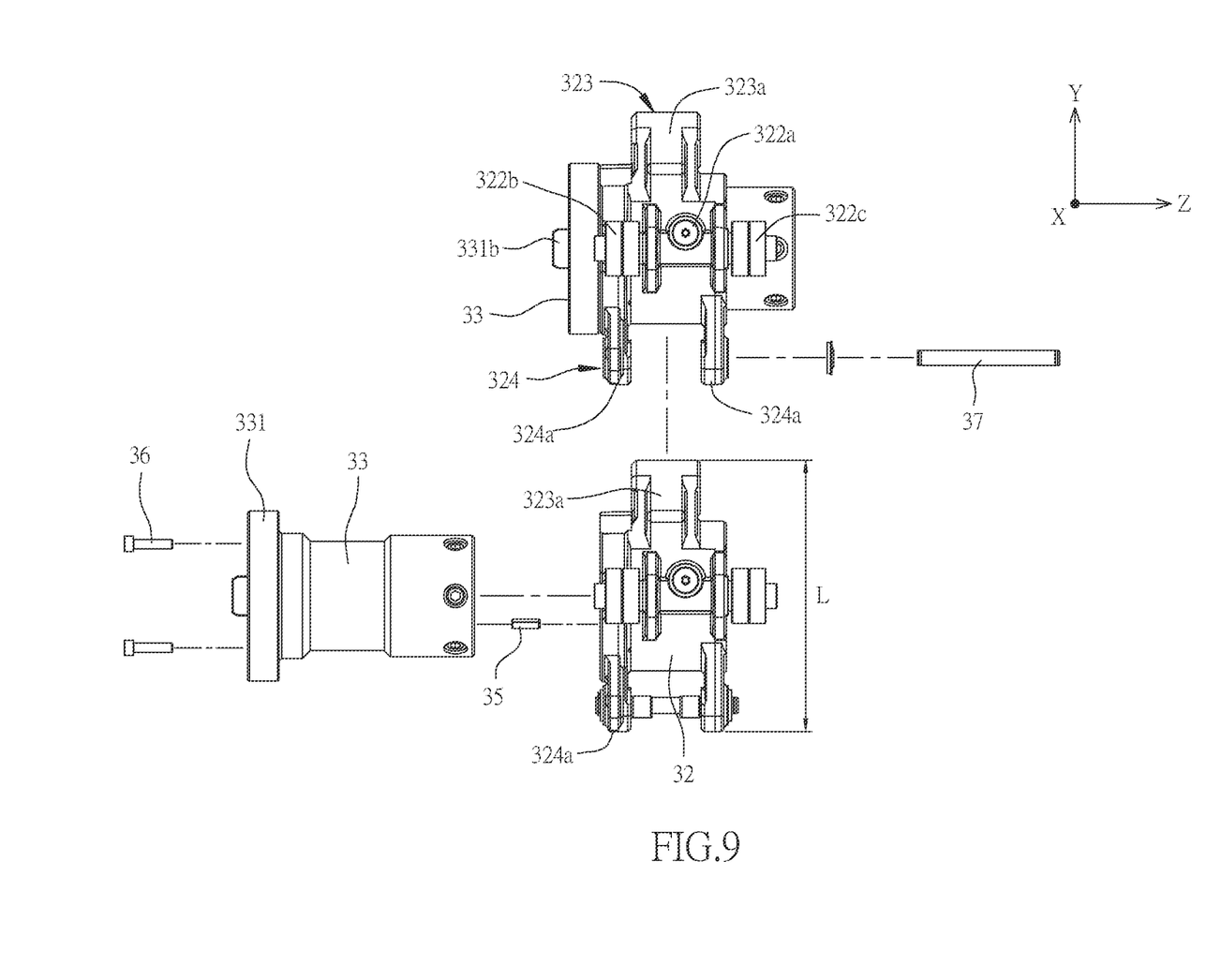
FIG. 9 is a side view of FIG. 8.

As shown in FIG. 8 and FIG. 9, each of the tool chains 31 of the chain 30 includes a link body 32, a tool pot 33, and a tool locking unit 34. The link body 32 has a mounting hole 32a located in the middle of the link body 32 and passing through the link body 32. The mounting hole forms a mounting part defined in the present invention. A front surface of the link body 32 has a plurality of screw holes 32b and a positioning hole 32c which are located at a periphery of the mounting hole 32a.

The tool pot 33 is detachably coupled to the link body 32 and moves in or out of the mounting hole 32a in a Z direction. The tool pot 33 has a tool accommodating chamber 33a for inserting a tool holder therein (not shown). The tool holder is restricted by the tool locking unit 34 disposed at a rear section of the tool pot 33 and cannot detach from the tool pot 33. In the current embodiment, a front section of each of the tool pots 33 forms an outer flange 331 which has a plurality of through holes 331a and is provided with a positioning block 331b and a positioning hole 331c at a front surface and a rear surface respectively. Two ends of a dowel pin 35 are respectively inserted into the positioning hole 32c of the link body 32 and the positioning hole 331c of the tool pot 33 so that the plurality of bolt 36 can pass rapidly through the corresponding through holes 331a and the threaded holes 32b. Whereby, the purpose of the tool pot 33 being detachably coupled to the link body 32 can be achieved. The positioning block 331b provides the effect that the tool holder does not deflect after the tool holder is inserted in the tool pot 33. The tool pot 33 has a plurality of penetrating holes 332 at a rear section of the tool pot 33. The tool locking unit 34 is formed by a plurality of bead bodies 34a, springs 34b and abutting members 34c which are located in the corresponding penetrating holes 332. Each of the springs 34b is located between the corresponding one bead body 34a and the corresponding one abutting member 34c. One end of each of the springs abuts against the abutting member 34c while the other end thereof pushes the corresponding one bead body 34a so that a part of the bead body 34a abuts against a neck section of the tool holder (not shown) to have the tool holder not loosen from the tool pot 33. It is noted that the rear section of the tool pot 33 coupled to the link body 32 protrudes out of the link body 32, which is easy for the tool locking unit 34 to be inspected and maintained.

Each of the tool chains 31 of the link body 32 has a left guide section 321 and a right guide section 322 in an X direction respectively on two sides of the mounting hole 32a. Each of the tool chains 31 has a first link part 323 and a second link part 324 in a Y direction respectively on two sides of the mounting hole 32a. The left guide section 321 and the right guide section 322 respectively include a first roller, a second roller, and a third roller. Since the left guide section 321 and the right guide section 322 are symmetrical structures, the right guide section 322 is illustrated hereinafter as an example. The first roller 322a of the right guide section 322 takes an X axis in the X direction as a center of rotation and is coupled to the link body 32. The second roller 322b and the third roller 322c of the right guide section 322 located respectively on two sides of the first roller 322a take a Z axis in a Z direction as a center of rotation and are coupled to the link body 32. Between two adjacent tool chains, the first link part 323 of the previous tool chain 31 is pivotally connected to the second link part 324 of the latter tool chain 31 to achieve the purpose of series connection. In the current embodiment, the first link part 323 is formed by a drilled pivot seat 323a while the second link part 324 is formed by two drilled pivot ears 324a which are spaced apart. The pivot seat 323 is between the two pivot ears 324a and, by passing a pivot rod 37 through the through holes of the pivot ears 324a and the pivot seat 323a, the first link part 323 is pivotally connected to the second link part 324.

As shown in FIG. 5 and FIG. 6, the tool chain 31 is located in the guide groove of the track 20 of the physical support segment through the first roller 322a of the right guide section 322. The first roller is in contact with the upper confining surface S3 and the lower confining surface S4. The second roller 322b and the third roller 322c of the right guide section 322 of the tool chain 31 are respectively in contact with the upper abutting surface S1 and the lower abutting surface S2. Moreover, with the functions that the chain tension regulator 50 can moderately adjust the elastic potential energy of the elastic members 54 and the regulation units 60 can fine-tune the position of the track, it is beneficial to balance and stabilize the tension. And, when the tool chain 31 passes through the physical support segment, including the steering bases and the linear guide rails, the tool chain 31 is confined in the X direction and the Z direction simultaneously so as to move stably.

The tool chain 31 is defined to have a maximum width in a running direction. As shown in FIG. 9, the maximum width of the tool chain is a maximum distance L in a Y direction between the pivot seat 323a of the link body 32 and the pivot ear 324a thereof. As shown in FIG. 2 and FIG. 4, at least one of the first vacant running segment L1, second vacant running segment L2, and third vacant running segment L3 is greater than half of the maximum distance of one tool chain 31, and even more than one time or more than twice the maximum distance L of one tool chain 31. For example, the first vacant running segment L1 is substantially the double maximum distances L.

Figure 10:
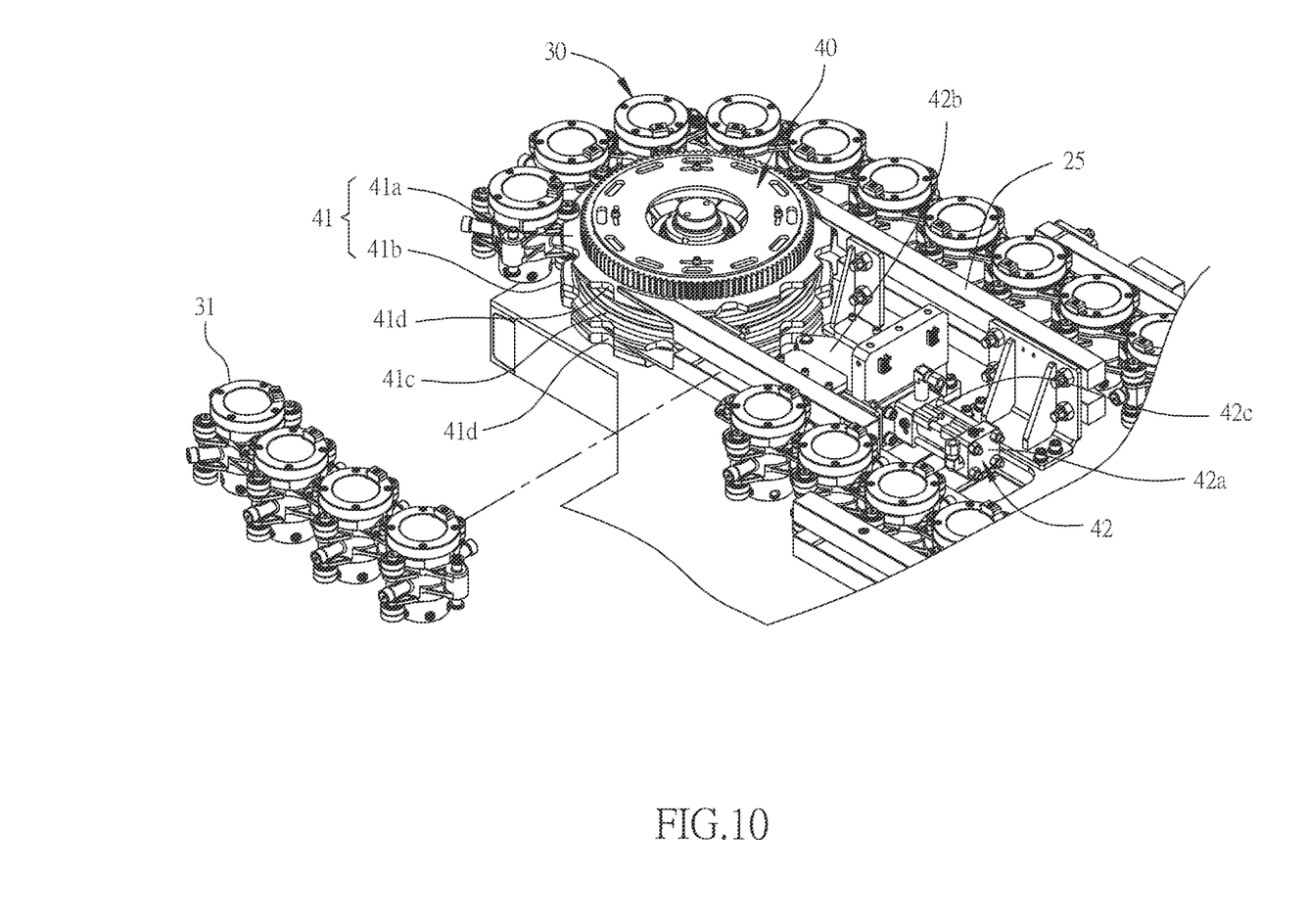
FIG. 10 is a partial perspective view of the chain-type tool magazine of the preferred embodiment.
Figure 11:
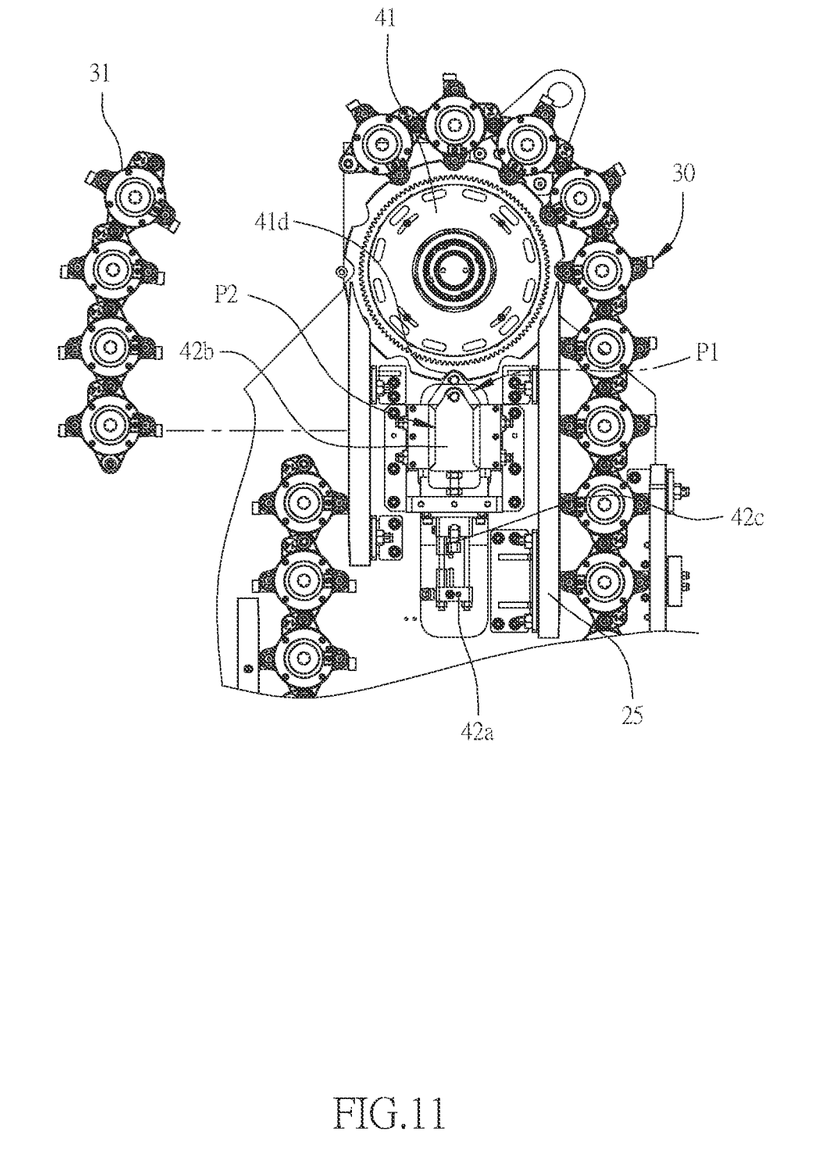
FIG. 11 is a top view of FIG. 10.

As shown in FIG. 10 and FIG. 11, the driving mechanism 40 includes a rotatable sprocket 41 and a positioning unit 42. The rotatable sprocket 41 has an upper rotary table 41a and a lower rotary table 41b which move coaxially together and are spaced apart. A sprocket groove 41c is formed between the upper rotary table 41a and the lower rotary table 41b, and a peripheral surface of the upper rotary table 41a and that of the lower rotary table 41b respectively have a plurality of guide recesses 41d. When each of the tool chains 31 of the chain 30 passes through the sprocket 41, the first roller 322a is located at the sprocket groove 41c, the second roller 322b is located at one of the guide recesses 41d of the upper rotary table 41a, and the third roller 322c is located at one of the guide recesses 41d of the lower rotary table 41b. And, when the sprocket 41 is driven, the sprocket 41 pushes the second roller 322b and the third roller 322c of the link body 32 of the tool chain 31 through the guide recesses 41a of the upper rotary table 41a and those of the lower rotary table 41b, so that the chain 30 can move around the running route provided by the track 20.

The positioning unit 42 includes an actuated cylinder 42a, a positioning block 42b, and a reed sensor 42c. The actuated cylinder 42a is fixed on the main body 10 and has a connecting rod (not shown) controlled to move. A front end of the connecting rod is connected to the positioning block 42b. A peripheral outline of a front end of the positioning block 42b conforms to the guide recess 41d. The positioning block 42b moves together with the connecting rod between a first position P1 (as shown by the imaginary line in FIG. 11) and a second position P2. When the positioning block 42b is located at the first position P1, the front end of the positioning block 42b protrudes into one of the guide recesses 41d of the sprocket 41 so that the sprocket 41 is in a state of stably stopping rotation. When the positioning block 42b is located at the second position P2, the front end of the positioning block 42b leaves the guide recess 41d of the sprocket 41 and leaves a rotating route of the sprocket 41 so that the sprocket 41 can rotate smoothly. The reed sensor 42c is for sensing a position of the positioning block 42b to generate a control signal in time to stop the actuated cylinder 42a.

The above is the description of the structure of the chain-type tool magazine 100 of the preferred embodiment according to the present invention. The specific effects are summarized as follows.

Each of the tool chains 31 includes sequentially the first link part 323, the right guide section 322, the second link part 324, and the left guide section 321, on the peripheral surface of the tool chain in a circumference direction. Each of the tool chains 31 is pivotally connected to the adjacent tool chain by the pivot rod 37 so that when the chain 30 runs around, each of the tool chains 31 can change the running direction by the pivot rod 37 as a single pivot. As shown in FIG. 2, the chain 30 runs around the second steering base 22 in a clockwise direction and runs around the first steering base 21 in a counterclockwise direction, which provides the advantage of a small radius of gyration so that the chain 30 can moderately increase more tool chains 31 to carry a larger number of tool holders.

Since the first roller 322a, the second roller 322b, and the third roller 322c of the tool chain 31 are confined simultaneously in the X direction and the Z direction and the chain tension regulator 50 can stabilize the tension of the chain 30, the chain 30 is able to run around in a manner that the chain 30 abuts against the track 20 on one side. More specifically, when making a turn, the chain 30 abuts against the track 20 through the guide sections on an inner side of the turning. As shown in FIG. 2, the chain 30 abuts against the first steering base 21 through the right guide section 322 of the tool chain 31 to make a turn, and the chain 30 abuts against the second steering base 22 through the left guide section 321 of the tool chain 31 to make a turn. Compare to the existing chain-type tool magazine which uses an outer guide rail and an inner guide rail arranged in parallel to confine both sides of a chain, the chain 30 of the current embodiment can run around stably with one side abutting against the track 20, which reduces the number of rails, manufacture cost, and the weight of the tool magazine. Besides, the track of the present invention takes a discontinuous broken-track type design (shown in FIG. 4), which further reduces the construction cost of the tool magazine. To increase the running stability of the chain 30, the track 20 can further include an auxiliary track 27 mounted at a specific area, such as an area in a horizontal direction where the chain 30 runs around, so as to support the chain 30 and not increase too much cost.

In the current embodiment, the tool pot 33 is designed to be able to be detached from the link body 32 so that the tool pot 33 can be regarded as an optional component. That is, there is no need to change the connected link bodies 32. As long as a tool pot with a different-size tool accommodating chamber is replaced, the chain 30 can carry a tool holder with a corresponding specification. In addition, the rear section of the tool pot 33 protrudes out of the link body 32, which is easy for the tool locking unit 34 to be inspected and maintained. The sprocket 41 of the current embodiment applies to the second roller 322b and the third roller 322c of the link body 32 respectively through the guide recesses 42d of the upper rotary table 41a and those of the lower rotary table 41b. When the sprocket 41 rotates, the sprocket 41 applies a force evenly to an upper part and a lower part of the link body 32 to indirectly apply the force evenly to the pivot rod 37 without excessively concentrating a stress on one side, which can extend the lifetime of the chain 30.

It must be pointed out that the embodiments described above are only some embodiments of the present invention. All equivalent structures which employ the concepts disclosed in this specification and the appended claims should fall within the scope of the present invention.

What is claimed is:
1. A chain-type tool magazine comprising:
a main body including a mounting surface;
a track mounted on the mounting surface of the main body and providing a running route which includes a physical support segment and a vacant running segment, the running route including linear running route segments and curved running route segments, the vacant running segment being in one of the linear running route segments;
a chain formed by a plurality of tool chain links connected in series; and
a driving mechanism for driving the chain to run around the running route provided by the track, wherein when each of the tool chain links of the chain passes through the physical support segment, each of the tool chain links is in contact with the physical support segment; and wherein when each of the tool chain links of the chain passes through the vacant running segment, the tool chain link that is passing through the vacant running segment is not in contact with the track.

2. The chain-type tool magazine of claim 1, including at least one chain tension regulator for regulating tension of the chain.

3. The chain-type tool magazine of claim 2, wherein the physical support segment of the track includes at least one steering base which is mounted on the main body and is movable; the chain tension regulator includes at least one elastic member and at least one adjusting member; wherein each of the at least one elastic member comprises a respective first end and a respective second end, wherein each of the first ends is applied to the at least one steering base, and wherein each of the second ends is closer to the at least one adjusting member than is the corresponding first end; the at least one adjusting member is for changing elastic potential energy of the at least one elastic member.

4. The chain-type tool magazine of claim 1, wherein each of the tool chain links of the chain has a respective mounting part; each of the tool chain links has a respective left guide section extending from a left side of the corresponding mounting part, and each of the tool chain links has a respective right guide section extending from a right side of the corresponding mounting part, wherein a longitudinal axis of each of the left and right guide sections extends in an X direction; each of the tool chain links has a respective first link part extending from an upper side of the corresponding mounting part, and each of the tool chain links has a respective second link part extending from a lower side of the corresponding mounting part, wherein a longitudinal axis of each of the first and second link parts extends in a Y direction; wherein the first link part of each of the tool chain links is pivotally connected to the second link part of an adjacent one of the tool chain links of the tool chain; each of the tool chain links abuts against the physical support segment with the corresponding left guide section or the corresponding right guide section.

5. The chain-type tool magazine of claim 4, wherein the physical support segment of the running route has a lateral surface and a guide groove; the guide groove has a lateral opening to divide the lateral surface into an upper abutting surface and a lower abutting surface; the guide groove has an upper confining surface and a lower confining surface facing each other; wherein the left guide section of each of the tool chain links includes: a respective first roller, a respective second roller, and a respective third roller; wherein the right guide section of each of the tool chain links includes: a respective first roller, a respective second roller, and a respective third roller; wherein each of the first rollers takes an X axis in the X direction as a center of rotation; wherein each of the second rollers and each of the third rollers are located on a respective one of two opposite sides of the corresponding first roller and take a Z axis in a Z direction as a center of rotation; wherein each of the first rollers is in contact with the upper confining surface and the lower confining surface; wherein each of the second rollers is in contact with the upper abutting surface; and wherein each of the third rollers is in contact with the lower abutting surface.

6. The chain-type tool magazine of claim 5, wherein the physical support segment of the running route includes a first steering base and a second steering base; each of the tool chain links of the chain abuts against the first steering base with the corresponding right guide section and each of the tool chain links of the chain abuts against the second steering base with the corresponding left guide section.

7. The chain-type tool magazine of claim 5, wherein the physical support segment of the running route includes at least one steering base and at least one linear guide rail; the at least one steering base has the lateral surface formed by an arc surface; an end of the at least one linear guide rail is connected to an end of the arc surface of the at least one steering base.

8. The chain-type tool magazine of claim 5, wherein the physical support segment of the running route includes a plurality of steering bases and a plurality of linear guide rails; two ends of a respective arc surface of each of the steering bases are each connected to a respective one of the linear guide rails; wherein the vacant running segment is formed by a discontinuous part between two adjacent ones of the linear guide rails on the running route; at least one linear guide rail of the plurality of linear guide rails is provided with at least one rail regulation unit for fine tuning a position of the at least one linear guide rail of the plurality of linear guide rails.

9. The chain-type tool magazine of claim 5, wherein the driving mechanism includes a rotatable sprocket having an upper rotary table and a lower rotary table which are coaxial and spaced apart; a peripheral surface of the upper rotary table has a plurality of guide recesses, and a peripheral surface of the lower rotary table has a plurality of guide recesses; wherein one of the first rollers of each of the tool chain links passing through the sprocket is located between the upper rotary table and the lower rotary table; wherein one of the second rollers of each of the tool chain links passing through the sprocket is located at one of the guide recesses of the upper rotary table; and wherein one of the third rollers of each of the tool chain links passing through the sprocket is located at one of the guide recesses of the lower rotary table.

10. The chain-type tool magazine of claim 9, wherein the driving mechanism includes a positioning unit having a positioning block which controllably moves between a first position and a second position; when the positioning block is located at the first position, a front end of the positioning block protrudes into one of the guide recesses of the sprocket; when the positioning block is located at the second position, the front end of the positioning block leaves the one guide recess of the sprocket and leaves a rotating route of the sprocket.

11. The chain-type tool magazine of claim 5, wherein the physical support segment of the running route includes a first steering base and a second steering base; each of the tool chain links of the chain abuts against the first steering base with the corresponding right guide section and each of the tool chain links of the chain does not abut against the first steering base with the corresponding left guide section, and each of the tool chain links of the chain abuts against the second steering base with the corresponding left guide section and each of the tool chain links of the chain does not abut against the second steering base with the corresponding right guide section.

12. The chain-type tool magazine of claim 4, wherein each of the tool chain links of the chain includes a respective link body and a respective tool pot; wherein each of the link bodies includes a respective one of the mounting parts which is a respective mounting hole passing through the corresponding link body; wherein each of the tool pots is detachably coupled to a corresponding one of the link bodies and moves in or out of the corresponding mounting hole in a Z direction.

13. The chain-type tool magazine of claim 12, wherein each of the tool pots has a respective tool accommodating chamber for inserting a respective tool holder therein; wherein a corresponding rear section of each of the tool pots is provided with a respective tool locking unit which restricts the corresponding tool holder from being disengaged from the corresponding tool pot.

14. The chain-type tool magazine of claim 1, wherein the vacant running segment of the track has a dimension in a running direction of the chain that is greater than half of a maximum width, in the running direction, of each individual tool chain link of the tool chain links of the chain.

15. The chain-type tool magazine of claim 1, wherein the main body is arranged upright and the mounting surface is vertically arranged.

16. The chain-type tool magazine of claim 1, wherein the running route includes at least one additional vacant running segment through which each of the tool chain links passes as the driving mechanism drives the chain to run around the running route; wherein when each of the tool chain links of the chain passes through the at least one additional vacant running segment, the tool chain link that is passing through the at least one additional vacant running segment is not in contact with the track.

\* \* \* \* \*